|  |  |
|---|---|
| United States Patent [19] | [11] 4,399,697 |
| Kohama et al. | [45] Aug. 23, 1983 |

[54] GAS FLOW MEASURING APPARATUS

[75] Inventors: Tokio Kohama, Nishio; Hideki Obayashi, Okazaki; Hisasi Kawai, Toyohashi; Tsuneyuki Egami, Aichi, all of Japan

[73] Assignee: Nippon Soken, Inc., Nishio, Japan

[21] Appl. No.: 247,114

[22] Filed: Mar. 24, 1981

[30] Foreign Application Priority Data

Mar. 26, 1980 [JP] Japan ................................ 55-39541
Jul. 28, 1980 [JP] Japan ............................... 55-104047

[51] Int. Cl.³ .............................................. G01F 1/68
[52] U.S. Cl. ........................................ 73/204; 73/116
[58] Field of Search ......................... 73/204, 116, 118

[56] References Cited

U.S. PATENT DOCUMENTS

| 3,900,819 | 8/1975 | Djorup | 73/204 |
| 3,975,951 | 8/1976 | Kohama et al. | 73/116 |
| 3,992,940 | 11/1976 | Platzer, Jr. | 73/204 |
| 4,028,689 | 6/1977 | Schopp | 73/204 |
| 4,210,616 | 7/1980 | Peter et al. | 73/116 |

Primary Examiner—Howard A. Birmiel
Attorney, Agent, or Firm—Cushman, Darby & Cushman

[57] ABSTRACT

A gas flow measuring apparatus for measuring intake air flow for an automobile engine having an electrical heater resistive member, and first and second temperature dependent resistive members. The first resistive member is located so as to be well influenced by heat from the heater resistive member, while the second resistive member is located so as to be little influenced by the same. The measuring apparatus measures a gas flow rate by using an output signal from a voltage dividing circuit as a series circuit of the first and second resistive members. In the gas flow measuring apparatus, a heater film resistive member is deposited on a first support member by an evaporation depositing or printing process, and is further covered with electric insulating material such as glass. The first resistive member is formed on the heat resistive member, with the insulating material interposing therebetween, whereby the close proximity of the heater resistive member to the first resistive member is realized, and the second resistive member is formed on a second support member.

14 Claims, 13 Drawing Figures

GAS FLOW MEASURING APPARATUS

RELATED REFERENCES

U.S. Ser. No. 92,024 filed Nov. 7, 1979, now U.S. Pat. No. 4,332,165, and U.S. Ser. No. 188,021 filed Sept. 17, 1980, now U.S. Pat. No. 4,357,830, which were assigned to the same assignee are copending applications of this application.

BACKGROUND OF THE INVENTION

The present invention relates to gas flow measuring apparatus and more particularly to an apparatus for measuring, for example, the amount of air flow to an engine.

In the past, there has been proposed an apparatus in which a flow measuring tube is disposed in the intake pipe of an automobile engine, and an electrical heater and two temperature dependent resistors, which are each comprised of a platinum resistive wire, are disposed in the flow measuring tube, whereby the flow rate of air (gas to be measured) is measured in accordance with the output signals of the heater and the resistors.

While this apparatus has an advantage of ensuring accurate flow measurement with a compact and simple construction, there is a disadvantage that since a very fine platinum resistive wire is used for the electrical heater and temperature dependent resistors and the resistors, and the resistors are used by suspending them in the air stream, there is problem from the strength point of view when the platinum resistive wires are subjected to a shock due to a backfire (if the ignition timing or the valve timing of the intake and exhaust valves are adjusted improperly in the engine combustion mechanism, a phenomenon, in which the fuel and air are burned explosively in the intake pipe by the flame in the combustion chamber, occurs and this phenomenon is called "backfire").

Further, in the measuring principle the control is initiated only when the heat of the electric heater is applied to the temperature dependent resistors, and consequently from the control point of view it is essential that the heat of the electric heater is rapidly transmitted to the temperature dependent resistors. However, the known apparatus is disadvantageous in that since the electric heater, the first temperature dependent resistor and the second temperature resistor are each mounted on a separate support, there is a limit in arranging the electric heater and the first temperature dependent resistor, which receives the heat from the former, in closer proximity to each other.

Another disadvantage is that since the electric heater and the first temperature dependent resistor adapted to receive the heat from the former are respectively disposed on the separate supports, the heat of the electric heater is not entirely applied to the first temperature dependent resistor and part of the heat is taken by the support, thus causing a flow measurement error corresponding to the heat loss and thereby deteriorating the measurement accuracy.

SUMMARY OF THE INVENTION

With a view to overcoming the foregoing disadvantages, it is an object of the present invention to provide a flow measuring apparatus which is improved in durability, flow measuring response and measuring accuracy.

According to one aspect of the present invention, first and second temperature dependent resistive wires are wound around first and second supports made from electric insulating material, increasing their strength and thereby preventing damages of the temperature dependent resistors and improving their durability. The electric heater resistive film member is deposited to the first support member made from electric insulating material by the evaporation depositing or printing process. Then, the electric heater resistor deposited is covered with insulating material such as glass or resin. This structure successfully makes the electric heater resistor closer to the temperature dependent resistive wire, thereby improving the response of the flow measurement.

According to another aspect of the invention, an electric heater resistive film member, first and second temperature dependent resistive member are deposited to support members in the form of a film. Particularly, the heater resistive film and the first temperature dependent resistive film are formed on the same support member in a closer proximity. This feature improves durability and flow measuring response. The deposition of the resistive films is preferably performed by the evaporation depositing or printing process. If necessary, the films of the first and second temperature dependent resistive members are attached to the support members and then covered with insulating material, thus ensuring the protection of them from being soiled by dust or the like.

According to the invention, the electric heater resistive film member and the temperature dependent resistive wire are formed on the same support member. With the structural feature, the first temperature dependent resistive wire can not only directly measure the heat from the heater resistor, but also measure the heat transmitted to the support member as support member temperature. The feature, therefore, reduces the heat loss of the electric heater resistor and improves the measurement accuracy.

Also according to the present invention, the first and second temperature dependent resistor wires are wound around the support members by depositing the electric heater resistor to the first support member by the printing or evaporation depositing process, and this feature makes the fabrication of the gas flow measuring apparatus easy.

DESCRIPTION OF THE PREFERRED EMBODIMENTS

The present invention will now be described in greater detail with reference to the illustrated embodiments.

Figure 1:
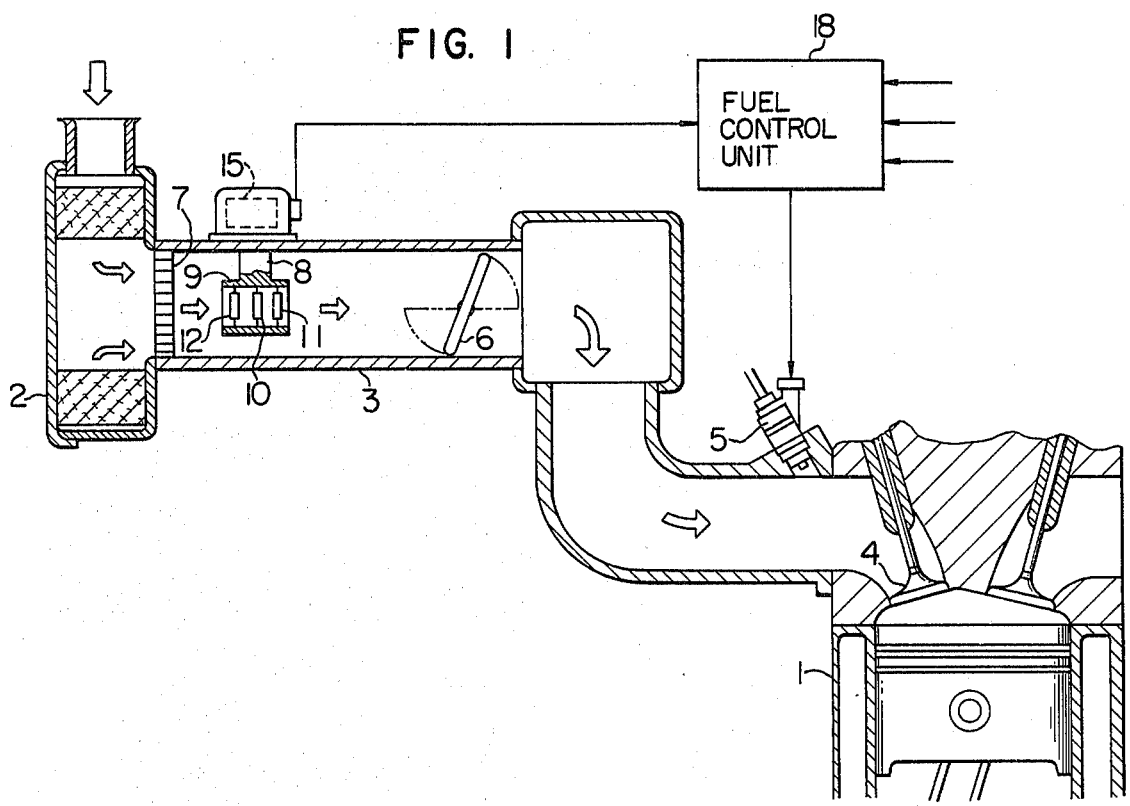
FIG. 1 is a schematic diagram showing the overall construction of an engine with a gas flow measuring apparatus according to the present invention.

Referring to FIG. 1, there is shown an example of an engine of the fuel injection and spark ignition type using a flow measuring apparatus according to the present invention. In the Figure, an engine 1 is a spark ignition engine for automobiles and the combustion air is taken in through an air cleaner 2, an intake pipe 3 and an intake valve 4. The fuel is supplied through an electromagnetic fuel injection valve 5 mounted in the intake pipe.

Disposed in the intake pipe 3 is a throttle valve 6 which is operated by the driver as desired, and a honeycomb member 7 for making the air flow uniform or straightening the air flow is disposed at junction between the air cleaner 2 and the intake pipe 3. The member 7 uniforms the flow of the intake air and improves the measuring accuracy in the flow measurement by flow measuring apparatus to be given later.

Also disposed in the intake pipe 3 between the honeycomb member 7 and the throttle valve 6 is a small flow measuring tube 9 which is suspended from a supporting member 8 to extend substantially parallel to the axial direction of the intake pipe 3 and serves as a sensor section in a flow measuring apparatus according to the invention. Disposed in the flow measuring tube 9 and shown schematically are a platinum resistance film 10 forming an electric heater resistor which are evaporation deposited or printed on a first support member. A platinum resistance wire 11, serving as a temperature dependent resistance wire, formed on the electric heater resistor 10 with an insulating member interposed therebetween. Further disposed within the flow measuring tube 9, platinum resistance wire 12 as a second temperature dependent resistance wire which is provided on a second supporting member located upstream of the heater resistor 10 with a slight separation therebetween. The flow measuring tube 9 is fixed such that its axial direction is in parallel with that of the intake pipe 3 between a throttle valve 6 of the intake pipe 3 and the member 7. The respective resistors 10, 11 and 12, provided on the first and second support members in a member to be described later, are held within the flow measuring tube 9 connected to a measuring circuit 15.

Figure 3A:
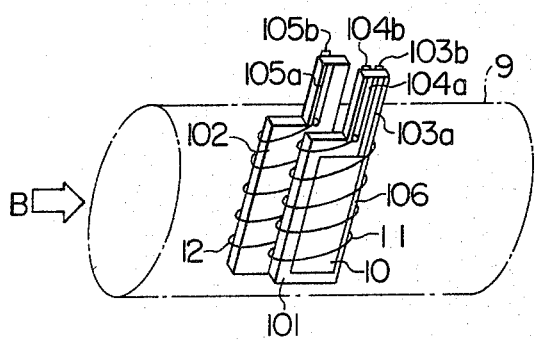
FIG. 3A is a prespective view showing a sensor section used in the flow measuring apparatus shown in FIG. 1.
Figure 3B:
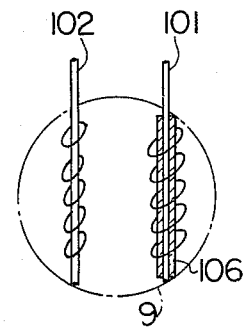
FIG. 3B is a cross-sectional view of the sensor section as viewed in a direction of an arrow in FIG. 3A.

FIGS. 3A and 3B respectively show a perspective view of a first specific embodiment of supports for the electric heater 10 and the first and second temperature dependent resistors 11 and 12 and a diagram as viewed in the direction of an arrow, and they will be described with reference to the Figures. The electric heater 10 is deposited on both sides of a plate support 101 which is made from electric insulating material such as ceramic and synthetic resin by the vapor depositing or printing process, and has voltage applied through copper foils 103a and 103b. The two electric heater resistors 10 are interconnected by a conductor passing through the lower end portion of the first supporter 101. The electric heater resistor 10 is coated with an insulating material 106, for example, glass or resin in the thickness of several μm. The electric heater resistor 10 is further wound by a first temperature dependent wire 11. The second temperature dependent resistor wire 12 is similarly wound around a second support. The first and second temperature dependent resistor wires 11 and 12 respectively start from the copper foils 104a and 105a to downwardly wind around the supports, to turn in U shape at the lower end of the supports, and to upwardly wind them again to connect to the opposite copper foils 104b and 105b.

Of those first and second supports 101 and 102 disposed in parallel with the flow direction of air stream, as indicated by an arrow B, the supporter 102 is preferably disposed upstream of the supporter 101, that is, at a location little influenced by heat from the heater resistor 10.

While the heat resistor wires 10, and the first and second temperature dependent resistor wires 11 and 12 are each made of platinum whose resistance value varies with temperature, the resistance wires 11 and 12 have the same resistance-temperature characteristics. It is evident that the temperature dependent resistor wires, which are made from platinum in the present embodiment, may be made from platinum alloy or tungsten.

The resistance wires 10, 11 and 12 are respectively connected to a measuring circuit 15 through the copper foils 103a, 103b, 104a, 104b, 105a and 105b, which are fixed to the corresponding supports 101 and 102. The measuring circuit 15 thus connected measures an amount of air flow to the engine and produces an electrical signal representing the flow rate measured.

Figure 2:
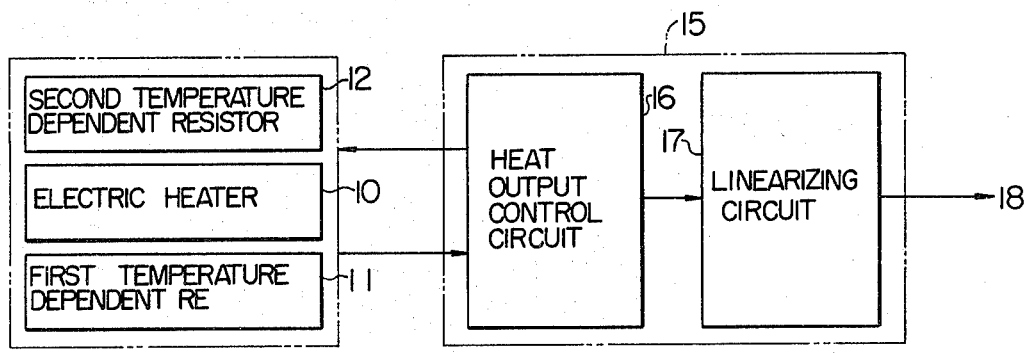
FIG. 2 is a block diagram of the measuring circuit used in flow measuring apparatus shown in FIG. 1.

As shown in FIG. 2, the measuring circuit 15 comprises a heat output control circuit 16 and a linearizing circuit 17. The heat output control circuit 16 is responsive to the output signals of a bridge including the resistance wires 11 and 12 to control voltage applied to the heater resistor wire 10 and the bridge. The linearizing circuit 17 provides a compensation that the output signal of the heat output control circuit 16 is made linear with respect to the amount of air flow.

Referring again to FIG. 1, a fuel control unit 18 responds to the signal from the measuring circuit 15 to control the duration of opening of the electromagnetic fuel injection valve 5, and the control unit 18 also receives the output signals of other sensors (not shown) including an engine speed sensor for detecting the rotational speed of the engine 1.

Figure 4:
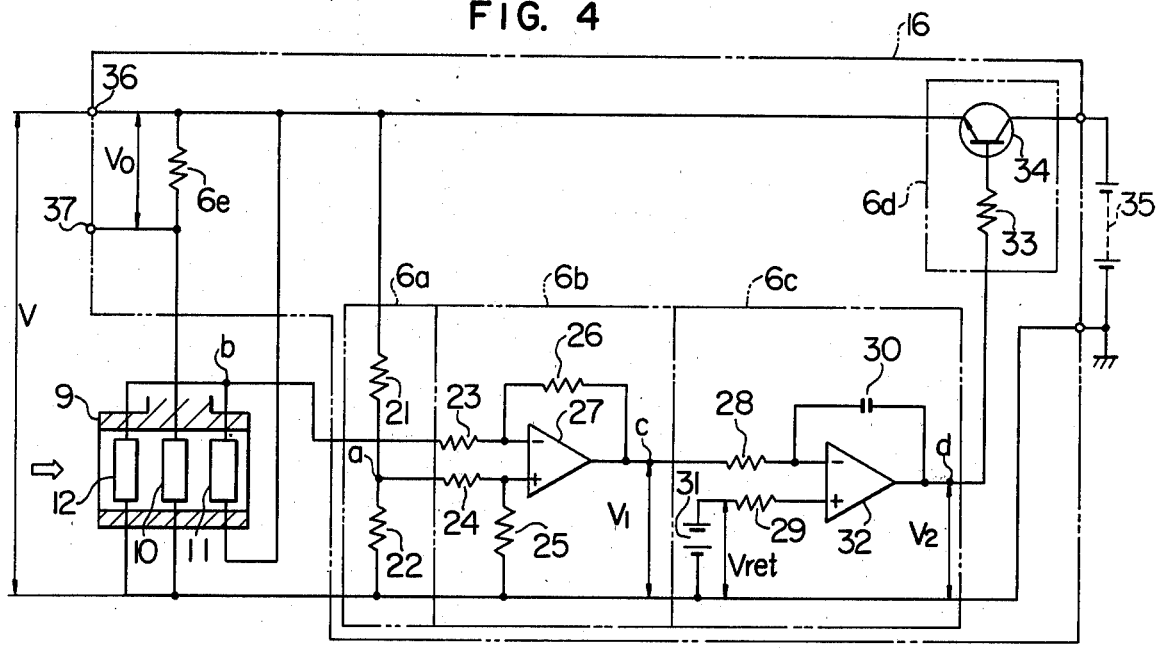
FIG. 4 is a circuit diagram of the heat output control circuit shown in FIG. 2.

Next, the heat output control circuit 16 will be described with reference to FIG. 4. Basically, the heat control circuit 16 comprises a reference resistor means 6a, a first differential amplifier 6b, a second differential amplifier 6c, a power amplifier 6d and an output resistor 6e.

Of those components, the reference resistor means 6a comprises resistors 21 and 22 which form, in cooperation with the resistor wires 11 and 12 schematically shown, the bridge.

The first differential amplifier 6b comprises input resistors 23 and 24, a ground resistor 25, a negative feedback resistor 26 and an operational amplifier (referred to as an OP AMP) 27, and it amplifies differentially the output voltages at the diagonal points a and b of the bridge to generate an output signal at the terminal c.

The second differential amplifier 6c comprises input resistors 28 and 29, a capacitor 30, a reference voltage source 31 and an OP AMP 32, and it amplifies differentially the output voltage at the terminal c and the fixed reference voltage $v_{ref}$ from a reference voltage source 31 to generate an output signal at the terminal d. The capacitor 30 is provided to prevent the gas flow measuring apparatus from oscillating.

The power amplifier 6d comprises a resistor 33 and a power transistor 34 supplied with power from a battery 35. The power amplifier 6d amplifies the output voltage from the second differential amplifier 6c to apply the resulting output signal to the bridge and the heater resistor wire 10.

The output resistor 6e, connected in series to the heater resistor wire 10, is provided to apply a voltage relating to the amount of air flow to the linearizing circuit 17. The output resistor has the terminals 36 and 37 connected to the linearizing circuit 17.

Figure 5:
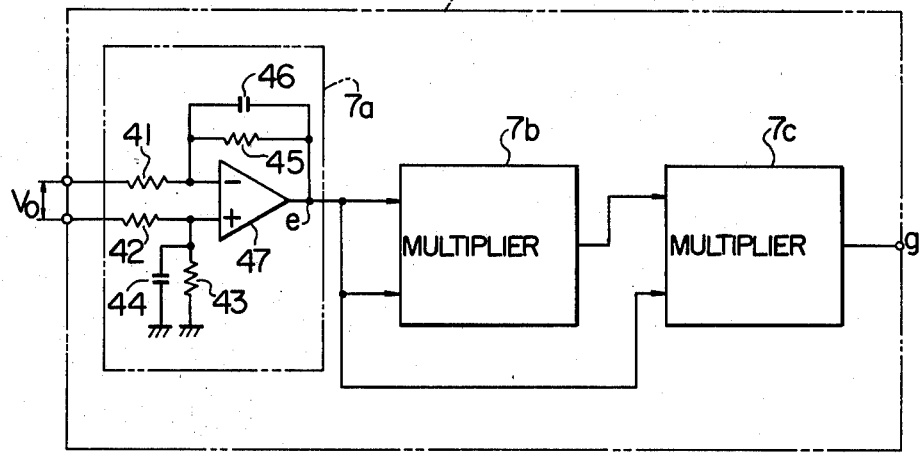
FIG. 5 is a circuit diagram of the linearizing circuit shown in FIG. 2.

The linearizing circuit 17 shown in FIG. 5 will be described. The linearizing circuit 17 is comprised of a differential amplifier 7a, and multipliers 7b and 7c. The differential amplifier 7a comprises input resistors 41 and 42, a ground resistor 43, a ground capacitor 44, a negative feedback resistor 45, a capacitor 46 and an OP AMP 47, and it amplifies differentially the output voltage from the heat output control circuit 16 to produce an output signal at the terminal e.

Each of the multipliers 7b and 7c is of the known analog type in which the two input voltages are multiplied and a voltage representing the resulting product is produced.

The operation of the apparatus with such a construction will be described. An amount of air determined by the opening of the throttle valve 6 is supplied to the engine 1 from the air cleaner 2 through the intake pipe 3. A fixed proportion of this total air flow is taken into the engine 1 through the flow measuring tube 9.

In the flow measuring tube 9, the second resistance wire 12 is positioned so as not to be influenced by the heater resistor wire 10 and only depends on the temperature of the air drawn in. The first temperature dependent resistor wire 11 closely wound around the heater resistor 10 through the insulating member 106 is influenced by the temperature of the intake air temperature and the amount of heat from the heater resistor 10, that is, the temperature of the air heated by the heater resistor wire 10 and the temperature of the support 101.

As a result, between the resistance wires 11 and 12 is produced a temperature difference $\Delta T$ which is related to the power supply P(W) supplied to the heater 10 and the air flow rate G (g/sec). There is a relationship among the P, G, and $\Delta T$ as given by the following equation.

$$K_1 \cdot \Delta T = P/G \quad (1)$$

where $K_1$ is a constant.

In this case, since the electric resistance value of each of the resistor wires 11 and 12 varies in response to the air temperature, between the points a and b of the bridge is produced a potential difference $\Delta V$ which is determined by the temperature difference $\Delta T$ and the voltage V applied to the bridge as follows $$\Delta V = K_2 \cdot \Delta T \cdot V \quad (2)$$

where $K_2$ is a constant.

As a result, the following relationship is obtained from the above-mentioned equations (1) and (2).

$$K_3 \cdot \Delta V/V = P/G \quad (3)$$

where $K_3$ is a constant.

Thus, if the power supply P to the heater resistor wire 10 and the bridge applied voltage V are controlled so as to hold the potential difference $\Delta V$ at a constant value, the relationship among the air flow rate G, the power supply P and the bridge applied voltage V is given by the following equation, $$G = K_4 \cdot P \cdot V \quad (4)$$

where $K_4$ is a constant.

If the resistance value of the output resistor 6e is selected small as compared with that of the heater resistance wire 10 and the current flowing to the heater resistance wire 10 is represented by I, there hold the following relations (5) and (6)

$$P \approx K_5 \cdot I^2 \text{ (where } K_5 \text{ is a constant)} \quad (5)$$

$$V \approx K_6 \cdot I \text{ (where } K_6 \text{ is a constant)} \quad (6)$$

Hence, the equation (4) is rewritten into $$G \approx KI^3 \text{ (where } K \text{ is a constant)} \quad (7)$$
$$\approx K'V^3 \text{ (where } K' \text{ is a constant)} \quad (8)$$

Thus, the air flow rate G is a function of the current I (or the voltage V). In this case, although the equations (7) and (8) are approximate equations, they are such that no effect will be produced on the measurement and thus there is practically no problem in actual applications.

The heat output control circuit 16 controls the amount of heat generated by the heater resistance wire 10 so as to maintain the potential difference $\Delta V$ at a constant value. In other words, if the amount of air flow is increased, the rise in the temperature of the air heated by the heater resistance wire 10 is decreased, decreasing the temperature difference $\Delta T$ between the resistance wires 11 and 12 and also decreasing the potential difference $\Delta V$ between the bridge points a and b.

Therefore, the output voltage $V_1$ of the first differential amplifier 6b decreases, while the output voltage $V_2$ of the second differential amplifier 6c adapted to generate a voltage corresponding to $(V_{ref}-V_1)$ increases. As a result, the power amplifier 6d increases the current supplied to the heater resistance wire 10 to increase the amount of heat generated by the heater resistor wire 10.

Accordingly, the temperature difference $\Delta T$ between the resistor wires 11 and 12 increases and the potential difference $\Delta V$ between the bridge points a and b is large. And the potential difference V is equal to the reference voltage $V_{ref}$. At this time, a stable condition is established with the whole system balanced but with the bridge unbalanced.

On the other hand, when the amount of air flow decreases, the rise in the temperature of the air heated by the heater resistor wire 10 and the temperature difference $\Delta T$ between the resistor wires 11 and 12 increases, so that the potential difference $\Delta V$ increases.

Therefore, the output voltage $V_1$ of the first differential amplifier 6b increases, while the output voltage $V_2$ of the second differential amplifier 6c decreases. And the power amplifier 6d decreases the current fed to the heater resistor wire 10, thus decreasing its heat output.

The temperature difference ΔT decreases while the potential difference ΔV decreases, and the potential difference ΔV is equal to the reference voltage $V_{ref}$. At this time, the system and the bridge, therefore, are stabilized.

In this way, the potential difference ΔV between the bridge points a and b is always maintained at the fixed value $V_{ref}$ irrespective of the amount of air flow to the engine, so that the equation (7) holds and the air flow rate G is expressed as a function of the cube of the current I flowing in the electric heater 10.

Since the current I also flows through the output resistor 6e, the current I is proportional to the terminal voltage $V_o$ of the output resistor 6e and the cube of this voltage $V_o$ is proportional to the air flow rate G.

Thus, the output voltage $V_o$ of the heat output control circuit 16 is cubed by the linearizing circuit 17. In other words, the terminal voltage of the output resistor 6e in the heat output control circuit 16 is amplified by the differential amplifier 7a which in turn generates a voltage given by $A_1 \cdot V_o$. Here, $A_1$ is the amplification factor of the amplifier 7a.

The output voltage $A_1 \cdot V_o$ is applied to the two input terminals of the multiplier 7b which in turn generates a voltage given by $A_1^2 \cdot V_o^2$. The voltage $A_1 \cdot V_o$ and $A_1^2 \cdot V_o^2$ are applied to the multiplier 7c which in turn generates a voltage given by $A_1^3 \cdot V_o^3$.

In this way, the linearizing circuit 17 produces from its output terminal g a voltage $V_g$ which is proportional to the cube of the voltage $V_o$ or the amount of air flow.

The voltage $V_g$ is applied, as a signal indicative of the air flow rate G, to the fuel control unit 18 which in turn produces an injection pulse signal to open the fuel injection valve 5 in response to the signal of the air flow rate G. As a result, an air-fuel mixture having the accurate air-fuel ratio A/F is supplied to the engine 1, so that the exhaust emission control, power output, fuel consumption, etc., of the engine 1 are improved.

While the electrical heater resistor 10 is rectangular in the embodiment shown in FIGS. 3A and 3B, it may take a polygonal line such as a series of U-shapes alternately arranged or a zig-zag shape. Any shape is allowed for the heater resistor 10 provided that the heater resistor 10 is deposited.

Figure 9A:
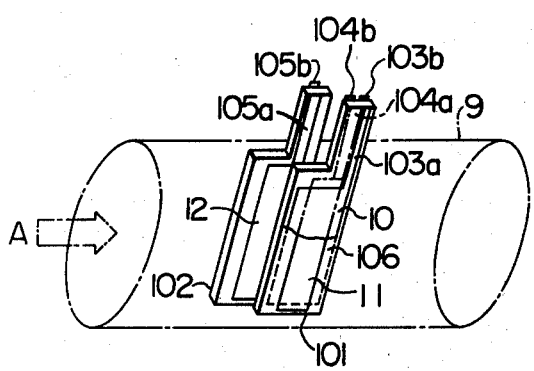
FIG. 9A is a perspective view showing another embodiment of the sensor.
Figure 9B:
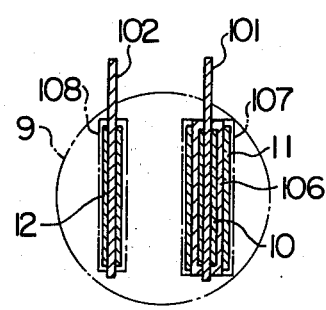
FIG. 9B is a cross-sectional view the sensor section as viewed in an arrow direction in FIG. 9A.

FIGS. 9A and 9B are another embodiment of the supports for the electric heater resistor wire 10, the first and second temperature dependent resistor wires 11 and 12 according to the present invention. As shown, the respective resistor members 10, 11 and 12 are formed like a film. For supporting those resistor members, the first and second supports 101 and 102 are used. The resistance films 10 to 12 are made from platinum film. The respective supports 101 and 102 are formed like plates made from electrical insulating material such as ceramic or synthetic resin. Further, the electric heater resistor 10 and the first temperature dependent resistor 11 for receiving heat from the former are provided on the same support 17, and the second temperature dependent resistor 12 is solely provided on the second support 18.

A platinum film 10 serving as the electric heater resistive member is deposited with a pattern in a rectangular shaper on each of both sides of the first support 101. Both the resistive films 10 are interconnected to each other by a conductor (not shown) passing through the lower end portion of the support. A voltage is applied through the copper foils 103a and 103b attached to both sides of the upper portion of the support to the resistive films 10. The resistive films 10 are covered with an insulating layer 106 with a thickness of several μm made from ceramic, synthetic resin and glass. The platinum resistive film 11 serving as the first temperature dependent resistors is deposited in a rectangular pattern on the surface of the insulating layer 106 covering both surfaces of the first support 101. A voltage is applied through the copper foils 104a and 104b to the platinum resistive film 11. The platinum resistive film 12 serviing as the second temperature dependent resistive member is deposited on the surface of both sides of the second support 102 and is supplied with a voltage through the copper foils 105a and 105b. The second temperature dependent resistive member 12 is so selected to have the same resistor-temperature characteristic as the first temperature dependent resistive member 11.

The deposition of the respective resistive members 10, 11 and 12 are performed by the depositing or printing process. The use of the process simplifies the depositing work and secures a reliable deposition. If necessary, the platinum resistor films 11 and 12 as the first and second temperature dependent resistors are covered for their protection with insulating layers 107 and 108 made from glass, synthetic resin or the like, as indicated by two-dot chain lines in FIG. 3B. The provision of the insulating layers 107 and 108 protects the resistive members 11 and 12 from the influence of dirt.

Figure 10:
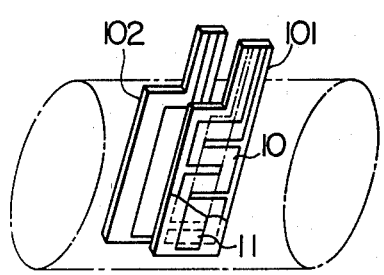
FIGS. 10 and 11 are cross-sectional views showing respectively further embodiments of the sensor section.
Figure 11:
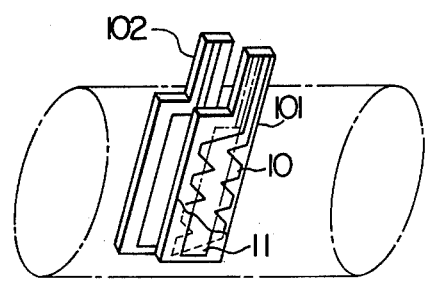

The pattern of the platinum resistive film is not limited to that shown in FIGS. 9A and 9B. For example, a series of U-shaped configuration alternately arranged, as shown in FIG. 10 or a chain of V-shaped configurations, as shown in FIG. 11 is allowed for the pattern of the electric heater resistive member. The same thing is true for the first and second temperature dependent resistors. Platinum alloy or tungsten may be used for the temperature dependent resistive members 11 and 12.

In the invention, the first temperature dependent resistive wire 11 is wound around the electric heater resistor 10 deposited or printed around the first support 101, with the insulating member interposed therebetween. Because of this structure, the heat from the electric heater resistive member 10 partially absorbed by the support 101 is transferred to the first temperature dependent wire 11, with the result that the heat loss of the electric heater is reduced and the measurement accuracy improved.

The structure that the electric heater resistor 10 and the first temperature resistor wire 11 are formed on the same support member, allows a close proximity arrangement of the electric heater resistor and the first temperature resistive wire. Therefore, the gas flow measuring apparatus is remarkably improved in the response of the flow measurement.

The unique structure of the invention is strong against a shock wave such as from a backfire thus improving the measuring apparatus.

The manufacturing work is easy and simple in that the electric heater resistive member 10 is deposited or printed on the first support member 101 and then the first and second temperature dependent resistive wires 11 and 12 are wound around the corresponding support members.

Figure 6:
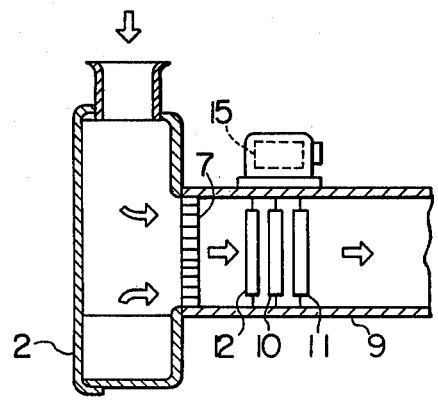
FIG. 6 is a principal sectional view showing another embodiment of the invention.
Figure 7:
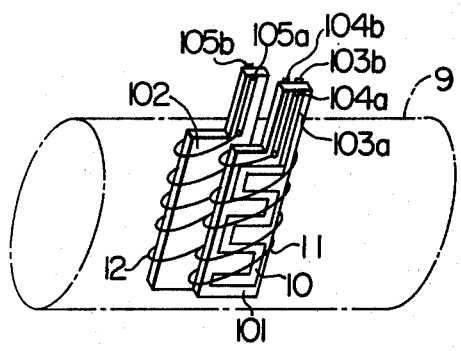
FIGS. 7 and 8 are perspective views showing respectively other embodiments of the sensor section used in the flow measuring apparatus according to the present invention.
Figure 8:
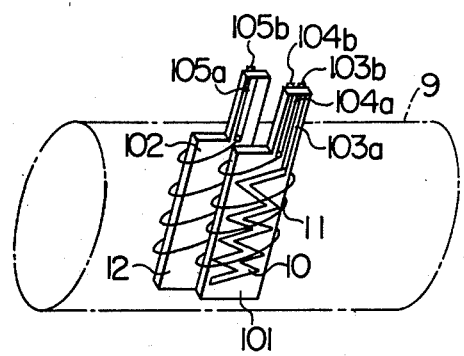

While the above embodiment disposes the small diameter tube as the flow measuring tube 9 in the intake tube 3, the intake pipe per se may be used for the flow measuring tube 9, as shown in FIG. 6.

The flow measuring apparatus is applied for the engine of which air flow is of the unidirectional type, in the above embodiments. The structure feature that the electric heater resistive member and the first temperature dependent resistive wire 11 are formed on the same support member, further allows the measuring apparatus to be applied for an apparatus in which air flows bidirectionally in normal and reverse directions.

We claim:

1. A gas flow measuring apparatus comprising:
   a flow measuring tube through which gas to be measured flows;
   a first support member made of electrical insulating material provided in said flow measuring tube;
   an electrical heater resistive film member which is deposited on said first supporting member;
   an electrical insulating material covering said electrical heater resistive member and consisting of a thin, insulating layer;
   a first temperature dependent resistive means provided on said electrical insulating material covering said electric heater resistive member;
   a second support member made of electrical insulating material disposed at a location little influenced by the heat from said electrical heater resistive member;
   a second temperature dependent resistive member wound around said second support member; and
   a measuring circuit which applies voltage to said electrical heater resistive member, and said first and second temperature dependent resistive members for measuring a flow rate of said gas.

2. A gas flow measuring apparatus according to claim 1, wherein said heater resistive member is formed in said support member by an evaporation depositing process.

3. A gas flow measuring apparatus according to claim 1, wherein said heater resistive film member is deposited on said first support member by a printing process member.

4. A gas flow measuring apparatus according to claim 2 or 3, wherein said heater resistive film member is of rectangular shape.

5. A gas flow measuring apparatus according to claim 1, 2 or 3, wherein said heater resistive film member is shaped in a polygonal line.

6. A gas flow measuring apparatus according to claim 1, wherein said first temperature dependent resistive means is a wire, and said wire is wound around said electrical insulating material.

7. A gas flow measuring apparatus comprising:
   a flow measuring tube through which gas to be measured flows;
   a first support board made of electrical insulating material provided in said flow measuring tube;
   a film-like electrical heater resistive member which is formed on said first support board;
   thin electrical insulating material covering said film-like electrical heater resistive member;
   a film-like first temperature dependent resistive member deposited on said electrical insulating material covering said heater resistive member;
   a second support board made of electrical insulating material disposed at a location little influenced by the heat from said electrical heater resistive member;
   a film-like second temperature dependent resistive member formed on said second support board; and
   a measuring circuit which applies voltage to said electrical heater resistive member, and said first and second temperature dependent resistive members for measuring a flow rate of said gas.

8. A gas flow measuring apparatus according to claim 7, wherein said heater resistive member is formed on said first support board, said first resistive member is formed on said electrical insulating material, and said second resistive member is formed on said second support board by an evaporation depositing process.

9. A gas flow measuring apparatus according to claim 7, wherein said heater resistive member is formed on said first support board, said first resistive member is formed on said electrical insulating material and said second resistive member is deposited on said second support board by a printing process.

10. A gas flow measuring apparatus according to claim 7, 8 or 9, wherein said heater resistive member is of rectangular shape.

11. A gas flow measuring apparatus according to claim 7, 8 or 9, wherein said heater resistive member is shaped in a polygonal line.

12. A gas flow measuring apparatus according to claim 7, 8 or 9, wherein said first and second resistive members are covered with electrical insulating material.

13. A gas flow measuring apparatus comprising:
    a flow measuring tube through which gas to be measured flows;
    a first support member made of electrical insulating material provided in said flow measuring tube;
    an electrical heater resistive film member which is deposited on said first supporting member, said electrical heater resistive member being shaped a polygonal line;
    a thin layer of electrical insulating material covering said electrical heater resistive member;
    a first temperature dependent resistive member on said electrical insulating material covering said electric heater resistive member;
    a second support member made of electrical insulating material disposed at a location little influenced by the heat from said electrical heater resistive member;
    a second temperature dependent resistive member wound around said second support member; and
    a measuring circuit which applies voltage to said electrical heater resistive member, and said first and second temperature dependent resistive members for measuring a flow rate of said gas, said measuring circuit including: a reference resistor circuit having a pair of resistors forming a voltage divider, said reference resistor circuit forming a bridge with said first and second temperature dependent resistive members, a first differential amplifier for differentially amplifying a voltage divider output of said reference resistor circuit and an output of another voltage divider including a series connection of said temperature dependent resistive members, a second differential amplifier for differentially amplifying a difference between a predetermined reference voltage and an output of said first differential amplifier, and a power amplifier for power amplifying an output of said second differential amplifier to generate a voltage corresponding to the voltage thereof and apply the same to said reference resistors voltage divider and said another voltage divider, and also apply to said electric heater resistive member through an output resistor, whereby generating a terminal voltage of said output resistor as an output voltage.

14. A gas flow measuring apparatus according to claim 13, wherein said first temperature dependent resistive member is a wire and said wire is wound around said electrical insulating material.

* * * * *